(12) United States Patent
Olsson et al.

(10) Patent No.: US 6,300,745 B1
(45) Date of Patent: Oct. 9, 2001

(54) METHOD IN CHARGING A BATTERY POWERED DEVICE AND APPARATUS FOR WORKING THE METHOD

(75) Inventors: Torbjörn Olsson, Södra; Leif Klingström, Lund, both of (SE)

(73) Assignee: Telefonaktiebolaget LM Ericsson, Stockholm (SE)

( * ) Notice: Subject to any disclaimer, the term of this patent is extended or adjusted under 35 U.S.C. 154(b) by 0 days.

(21) Appl. No.: 09/492,342

(22) Filed: Jan. 27, 2000

(30) Foreign Application Priority Data

Jan. 27, 1999 (SE) ................................................. 9900271

(51) Int. Cl.$^7$ ...................................................... H02J 7/00
(52) U.S. Cl. ............................................. 320/138; 307/66
(58) Field of Search ................................... 320/134, 138, 320/139; 307/64

(56) References Cited

U.S. PATENT DOCUMENTS

| | | | |
|---|---|---|---|
| 5,568,039 | 10/1996 | Fernandez | 320/150 |
| 5,569,550 | * 10/1996 | Garrett et al. | 429/7 |
| 5,691,622 | * 11/1997 | Mack et al. | 320/134 |
| 5,898,294 | * 4/1999 | Gold | 320/139 |

FOREIGN PATENT DOCUMENTS

| | | |
|---|---|---|
| 0 865 141 A2 | 9/1998 | (EP) . |
| 96/24170 | 8/1996 | (WO) . |

\* cited by examiner

*Primary Examiner*—Peter S. Wong
*Assistant Examiner*—Pia Tibbits
(74) *Attorney, Agent, or Firm*—Nixon & Vanderhye PC

(57) ABSTRACT

A method in charging a battery powered device (10) having a built-in charge control circuit (13) controlled by the device, and an apparatus for working the method, including said device. The device including the battery (11) is connected to a battery charger (17), and initially when the battery voltage is too low to initiate normal charging of the battery over the charge control circuit, the battery is connected to the battery charger via a current generator (25) which is switched off when the battery voltage has increased to a level which is high enough to support normal charging of the battery over the charge control circuit.

6 Claims, 1 Drawing Sheet

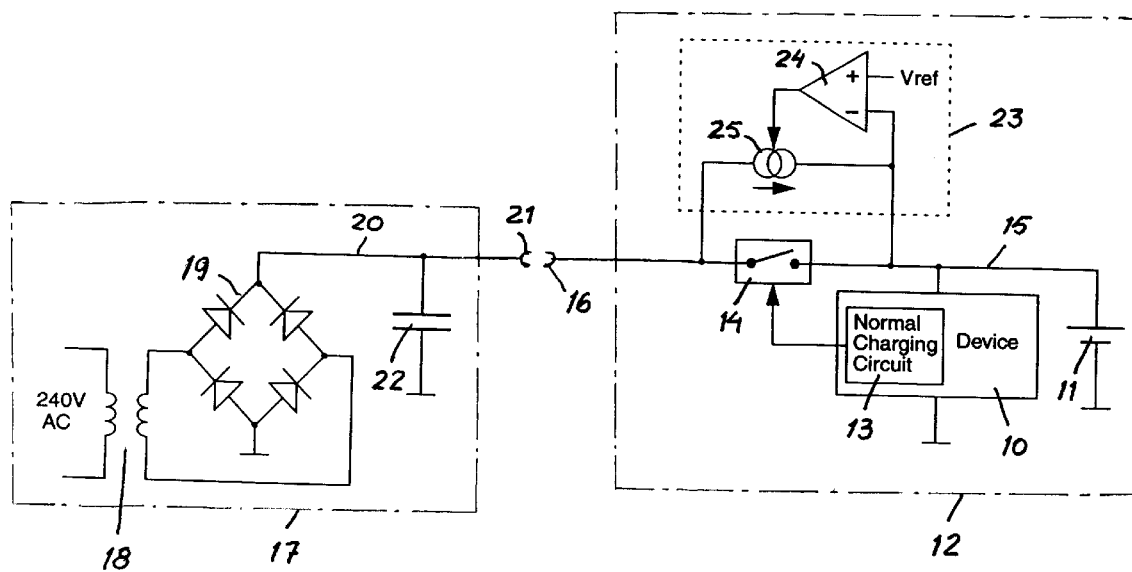

METHOD IN CHARGING A BATTERY POWERED DEVICE AND APPARATUS FOR WORKING THE METHOD

BACKGROUND OF THE INVENTION

1. Field of the Invention

The invention relates to a method in charging a battery powered device and an apparatus for working said method.

2. Description of the Prior Art

If the battery in prior art battery powered devices having a built-in charge control circuit controlled by the device, and a switch for connecting the device including the battery to a battery charger, has been discharged to such extent that the voltage thereof is too low to feed the device and to activate the charge control circuit thereof in order to initiate normal charging of the battery over said circuit when the device is connected to the charger, it may be impossible to start the device even if it is connected to the charger, and thus to charge the battery.

When the battery powered device having an almost flat battery is switched on the behaviour of the device accordingly is upredictable. Will the device be switched on correctly? Will the extra current flow to the device caused by decoupling capacitors when the device is switched on lower the battery voltage even more?

Different alternatives are available in order to charge the battery in case the device is not able to initiate charging due to lack of enough power from the battery when the device including the battery is connected to the charger:

- The battery is disconnected from the device and placed in a charger and then, when it has been charged, is replaced into the device. This must be done by the user himself, which makes the handling of the device more tedious;
- The device including the battery is connected to a charger which supplies a small trickle charge current which independently of the charge control circuit always charges the battery when connected to the charger. Eventually, the battery voltage will reach a level which is high enough in order to operate the device and initiate normal charging of the battery over the charge control circuit. In this case if the trickle charge current is supplied by a simple trickle charge resistor the trickle charge current has to be very low to prevent damage of the battery should the battery be charged already when it is connected to the charger. It follows that charging of a flat battery to switch-on level will take long time;
- The device is operated by the charging voltage which is applied directly to the device when the battery is connected to the charger. In this case the power supplied to the device cannot be controlled satisfactorily as to the quality thereof.
- The charging voltage is transformed to a high quality voltage used for operating the device when the battery is connected to the charger. This solution necessitates extra components to be included into the charger.

BRIEF SUMMARY OF THE INVENTION

In order to overcome the drawbacks mentioned above and to make the behaviour of the device predictable without any risk of damaging the battery by a too high uncontrollable trickle charge current, the invention provides a method in charging a battery powered device having a built-in charge control circuit controlled by the device, by connecting the device including the battery to a battery charger, wherein the device including the battery initially when the battery voltage is too low to initiate normal charging of the battery over the charge control circuit, is connected to the battery charger via a current generator which is switched off when the battery voltage has increased to a level which is high enough to support normal charging of the battery over the charge control circuit.

The invention also provides an apparatus for working the method comprising a battery powered device having a built-in charge control circuit controlled by the device, and a switch for connecting the device including the battery to a battery charger under the control of said charge control circuit for charging said battery, wherein a current generator is shunted over said switch to be switched on when the battery voltage is not high enough to initiate, over said charge control circuit, normal charging of the battery via said switch.

When the battery-powered device is connected to the charger and the battery voltage of the device is too low for normal operation, the current generator charges the battery with a well defined safe charge current independently of the normal charging circuit controlled by the device. The current generator will be switched off at a predetermined battery voltage which may be chosen such that a secure start-up of the device is guaranteed. When the predetermined voltage has been reached the device will be switched on in normal way and start recharging of the battery over the charge control circuit. The charge current supplied by the current generator does not have to be low since it is switched off when the battery voltage has reached the predetermined value. Thus, there is no risk of damage to the battery due to a too high uncontrollable charge current being supplied to the battery by the current generator, and a flat battery is charged rapidly. The behaviour of the device is predictable. The invention allows use of a normal battery. The current generator circuit is built into the apparatus and will not be noticed by the user, no external components being needed.

BRIEF DESCRIPTION OF THE DRAWING

In the drawing the single FIGURE is a circuit diagram illustating a presently preferred embodiment of the apparatus of the invention for working the method of the invention.

DETAILED DESCRIPTION OF THE INVENTION

A device 10 connected to a battery or chargeable electric cell 11 and comprising an electronic circuitry to be powered by the battery is included in an apparatus indicated by dot-and-dash lines 12 such as a portable wireless telephone set (mobile telephone). A charge control circuit 13 known per se in the art forms an integral part of device 10 and controls a switch 14 in a conductor 15 extending from a connector 16 to device 10 and battery 11 connected in parallel between said conductor and ground.

A battery charger indicated by dot-and-dash lines 17 comprises a transformer 18 to be connected to the mains of e.g. 240 AC to transform the power to low voltage. The transformer is connected at the low voltage side to a rectifier bridge 19 supplying low voltage DC on a conductor extending to a connector 21 a smoothing capacitor 22 being connected between conductor 20 and ground.

When apparatus 12 is connected to battery charger 17 at connectors 16 and 21 in order to charge battery 11 which has still a voltage which is sufficiently high to operate device 10 switch 14 will be closed by the device over charge control circuit 13 and normal charging of the battery from the battery charger will take place. If, however, the voltage of the battery is not enough to operate device 10 the switch will be in the open position and no charging of the battery from the battery charger can take place as explained above.

According to the invention a supplementary circuit is included into apparatus 12, which is indicated by dotted lines 23. This circuit comprises a comparator 24 the input of which is connected to conductor 15 between device 10 and switch 14 to detect the voltage of battery 11, and also to a reference voltage Vref supplied e.g. by a band-gap or diode powered from the battery charger (circuit not shown). Circuit 23 also comprises a current generator 25 (transistor) which is shunted over switch 14 and the operation of which is controlled by the output of comparator 24. The reference voltage Vref is given a predetermined value, and this value is chosen to represent the lowest battery voltage at which the battery is able to operate device 10 when the apparatus is connected to the battery charger, and thus to initiate normal charging of the battery under the control of the device over the charge control circuit. If the detected battery voltage when compared with Vref in comparator 24 is found to be lower than Vref the device will not be switched on for normal charging of the battery. Instead, the comparator will switch on current generator 25 so as to charge the battery by a well-defined charge current supplied by the current generator. When the battery has been charged to such extent that the battery voltage equals Vref device 10 will be switched on and normal charging of the battery under the control of the charge control circuit will be initiated and maintained the current generator being switched off by the comparator.

What is claimed is:

1. A method of charging a battery powered device from a battery charger, said device having a built-in charge control circuit, controlled by the device and operatively connected to a battery in the device, the method comprising:

comparing a battery voltage of the battery with a predetermined reference voltage;

when said battery voltage is lower than said reference voltage, charging said device from said battery charger via a current generator until the battery voltage has reached the reference voltage; and when or after the battery voltage has reached the reference voltage, switching off said current generator and charging the battery over the charge control circuit so that charging continues but now over the charge control circuit.

2. A method according to claim 1, wherein said reference voltage is sufficiently high to operate the device.

3. An apparatus comprising:

a battery powered device having a built-in charge control circuit for controlling the charging of a battery from a battery charger;

a current generator configured to be on for charging the battery when the battery voltage is lower than a reference voltage and to be off when the battery voltage is greater than the reference voltage; and wherein said charge control circuit is configured so as to be connecting said battery charger to the battery for normal charging when the battery voltage is greater than the reference voltage.

4. An apparatus according to claim 3, further comprising a switch for connecting the device and the battery to said battery charger under the control of said charge control circuit for charging said battery.

5. An apparatus according to claim 3, wherein said current generator is shunted over said switch, and said charge control circuit is configured to close said switch when the battery voltage equals the reference voltage for connecting the device to said battery charger for normal charging.

6. An apparatus according to claim 3, wherein said reference voltage is sufficiently high to operate the device.

* * * * *